(12) United States Patent
Kim et al.

(10) Patent No.: US 11,042,229 B2
(45) Date of Patent: Jun. 22, 2021

(54) DISPLAY APPARATUS AND CONTROL METHOD THEREOF

(71) Applicant: SAMSUNG ELECTRONICS CO., LTD., Suwon-si (KR)

(72) Inventors: Gwanhyung Kim, Suwon-si (KR); Huijun Shim, Suwon-si (KR); Jihye Ha, Suwon-si (KR); Sangho Kim, Suwon-si (KR); Hyunkyu Yun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/656,072

(22) Filed: Oct. 17, 2019

(65) Prior Publication Data

US 2020/0125189 A1 Apr. 23, 2020

(30) Foreign Application Priority Data

Oct. 17, 2018 (KR) ........................ 10-2018-0123791

(51) Int. Cl.
| | |
|---|---|
| *G06F 3/0354* | (2013.01) |
| *G06T 7/90* | (2017.01) |
| *G06F 3/041* | (2006.01) |
| *G01J 3/46* | (2006.01) |
| *G06F 3/042* | (2006.01) |

(52) U.S. Cl.
CPC ............ *G06F 3/03545* (2013.01); *G01J 3/46* (2013.01); *G06F 3/0421* (2013.01); *G06F 3/04162* (2019.05); *G06T 7/90* (2017.01)

(58) Field of Classification Search
CPC .... G01J 3/46; G06F 3/03545; G06F 3/04162; G06F 3/0421; G06F 3/0428; G06F 3/0418; G06F 3/0346; G06F 3/0488; G06F 3/043; G06F 3/0308; G06T 7/90; H04N 5/2254

See application file for complete search history.

(56) References Cited

U.S. PATENT DOCUMENTS

| | | | |
|---|---|---|---|
| 5,963,199 A | * | 10/1999 | Kato ..................... G06F 3/0488 345/156 |
| 9,671,882 B2 | | 6/2017 | An et al. |
| 2001/0050669 A1 | | 12/2001 | Ogawa |

(Continued)

FOREIGN PATENT DOCUMENTS

| | | |
|---|---|---|
| CN | 106095316 A | 11/2016 |
| JP | 2010-511207 A | 4/2010 |

(Continued)

OTHER PUBLICATIONS

International Search Report (PCT/ISA/210) dated Jan. 29, 2020 issued by the International Searching Authority in International Application No. PCT/KR2019/013326.

(Continued)

*Primary Examiner* — Richard J Hong
(74) *Attorney, Agent, or Firm* — Sughrue Mion, PLLC

(57) ABSTRACT

A display apparatus includes a display, a plurality of light emitting elements that emit light of different wavelengths and a plurality of light receiving elements, and a processor that identifies intensities light emitted by the light emitting elements and received by the light receiving elements to identify a pen color of a touch pen on a basis of the intensities.

14 Claims, 9 Drawing Sheets

(56) References Cited

U.S. PATENT DOCUMENTS

| | | | |
|---|---|---|---|
| 2007/0052692 A1* | 3/2007 | Gruhlke | G06F 3/0421 345/175 |
| 2011/0234542 A1* | 9/2011 | Marson | G06F 3/0418 345/175 |
| 2012/0133598 A1* | 5/2012 | Fan | G06F 3/0428 345/173 |
| 2012/0146947 A1* | 6/2012 | Massetti | H04N 5/2254 345/175 |
| 2012/0218229 A1* | 8/2012 | Drumm | G06F 3/0421 345/175 |
| 2013/0154985 A1 | 6/2013 | Miyazaki | |
| 2013/0257825 A1 | 10/2013 | Thompson | |
| 2014/0028629 A1* | 1/2014 | Drumm | G06F 3/0308 345/175 |
| 2014/0285473 A1 | 9/2014 | Chang | |
| 2015/0227261 A1 | 8/2015 | Huang et al. | |
| 2016/0062549 A1* | 3/2016 | Drumm | G06F 3/043 345/175 |
| 2017/0090598 A1 | 3/2017 | Morrison et al. | |
| 2017/0255337 A1* | 9/2017 | Drumm | G06F 3/0346 |
| 2018/0181222 A1 | 6/2018 | Ivanov | |

FOREIGN PATENT DOCUMENTS

| | | |
|---|---|---|
| JP | 2010-119064 A | 5/2010 |
| KR | 10-0753597 B1 | 8/2007 |
| KR | 10-1372423 B1 | 3/2014 |
| KR | 10-1395723 B1 | 5/2014 |
| KR | 10-2016-0148872 A | 12/2016 |
| KR | 10-1732957 B1 | 5/2017 |
| WO | 2007/083883 A1 | 7/2007 |

OTHER PUBLICATIONS

Written Opinion (PCT/ISA/237) dated Jan. 29, 2020 issued by the International Searching Authority in International Application No. PCT/KR2019/013326.

Communication dated Mar. 13, 2020, issued by the European Patent Office in counterpart European Application No. 19202649.0.

* cited by examiner

DISPLAY APPARATUS AND CONTROL METHOD THEREOF

CROSS-REFERENCE TO RELATED APPLICATIONS

This application claims is based on and claims priority under 35 U.S.C. § 119 to Korean Patent Application No. 10-2018-0123791, filed on Oct. 17, 2018, in the Korean Intellectual Property Office, the disclosure of which is incorporated herein by reference in its entirety.

BACKGROUND

Field

The disclosure relates to a display apparatus and a control method thereof and, more particularly, to a display apparatus using a touch pen and a control method thereof.

Description of the Prior Art

The development of electronic technology has led to development of various types of electronic products. Particularly, according to the flow of an electronic learning (e-Learning) system that utilizes an electronic device in the field of education or instruction, an electronic blackboard device combining functionalities of a display device and a blackboard has been widely used.

The electronic blackboard is mainly equipped with a touch screen, and a user may touch a touch screen using a user's body (for example, a finger, etc.) or an input device such as a touch pen.

However, the related-art display devices have an inconvenience in that a display device does not automatically recognize a color of a touch pen, and thus, a user setting is requested.

The related-art display device may automatically identify a pen color only when using a dedicated pen embedded with a specific module. In this case, a user may need to purchase an exclusive pen, and there is a limitation in that a pen color is not automatically recognized for a touch pen other than the exclusive pen. In addition, even when the display device is equipped with a separate camera and recognizes a pen color, there is a limitation that the pen color is inaccurately recognized according to the surrounding environment of the display device (for example, brightness of lighting, or the like).

Thus, there is a need for a method of a display device to recognize a pen color of a touch pen without using a camera or an exclusive pen.

SUMMARY

Embodiments of the disclosure may overcome the above disadvantages and other disadvantages not described above. Also, an embodiment is not required to overcome the disadvantages described above, and an embodiment may not overcome any of the problems described above.

According to embodiments, a display apparatus may identify a pen color using a light emitting element and a light receiving element.

A display apparatus for digitally drawing thereon based a touch pen, the display apparatus according to an embodiment includes a display, a plurality of light emitting elements that emit light of different wavelengths, a plurality of light receiving elements, and a processor configured to a first light emitting element among the plurality of light emitting elements to emit first light of a first wavelength and a second light emitting element among the plurality of light emitting elements to emit second light of a second wavelength different from the first wavelength, identify a first intensity of the first light received by at least one light receiving element among the plurality of light receiving elements, identify a second intensity of the second light received by the at least one light receiving element, identify a color based on the first intensity and the second intensity, and control the display to draw on the display markings corresponding to a touch position of the touch pen on the display in the color.

The processor may sequentially control the first light emitting element to emit the first light of the first wavelength at a first light emission timing and the second light emitting element to emit the second light of the second wavelength at a second light emission timing after the first light emission timing.

The processor may identify the color based on a signal intensity distribution of the first intensity and the second intensity.

The processor may detect a touch by the touch pen on the display, control at least one light emitting element among the plurality of light emitting elements to emit light, and identify the touch position of the touch pen on the display based on an intensity of the light emitted by the at least one light emitting element received by the plurality of light receiving elements.

An outer region of the display may include four border regions, and the plurality of light emitting elements may be disposed at two adjacent border regions, among the four border regions, and the plurality of light receiving elements may be disposed at two remaining border regions.

Each of the plurality of light receiving elements may be disposed between groups of the plurality of light emitting element groups or alternatingly disposed with each light emitting element among the plurality of light emitting elements.

The processor may select the first light emitting element from among the plurality of light emitting elements to emit the first light of the first wavelength and the second light emitting element from among the plurality of light emitting elements to emit the second light of the second wavelength based on the touch position of the touch pen.

The processor may control the display a touch trajectory by the touch pen as the identified color.

The display apparatus of claim may further include a bezel disposed at an outer region of the display, and a guide member formed to protrude at one region of the bezel, and the plurality of light receiving elements may be supported by the guide member and disposed to be inclined toward a direction of a screen of the display.

According to an embodiment, a method of controlling a display apparatus for digitally drawing thereon based a touch pen includes controlling a first light emitting element among a plurality of light emitting elements of the display apparatus to emit first light of a first wavelength and a second light emitting element among the plurality of light emitting elements of the display apparatus to emit second light of a second wavelength different from the first wavelength, determining a first intensity of the first light received by at least one light receiving element among a plurality of light receiving elements of the display apparatus, determining a second intensity of the second light received by the at least one light receiving element of the display apparatus, identifying a color based on the first intensity and the second intensity, and controlling a display of the display apparatus to draw on the display markings corresponding to a touch position of the touch pen on the display in the color.

The controlling the first light emitting element and the second light emitting element may include controlling the first light emitting element to emit the first light of the first wavelength at a first light emission timing and the second light emitting element to emit the second light of the second wavelength at a second light emission timing after the first light emission timing.

The identifying the color may include identifying the color based on a signal intensity distribution of the first intensity and the second intensity.

The method may include detecting a touch by the touch pen on the display, controlling at least one light emitting element among the plurality of light emitting elements to emit light, and identifying the touch position of the touch pen on the display based on an intensity of the light emitted by the at least one light emitting element received by the plurality of light receiving elements.

An outer region of the display may include four border regions, and the plurality of light emitting elements may be disposed at two adjacent border regions, among the four border regions, and the plurality of light receiving elements may be disposed at two remaining border regions.

Each light receiving element among the plurality of light receiving elements may be disposed between groups of the plurality of light emitting elements or alternatingly disposed with each light emitting element among the plurality of light emitting elements.

The method may include selecting the first light emitting element from among the plurality of light emitting elements to emit the first light of the first wavelength and the second light emitting element from among the plurality of light emitting elements to emit the second light of the second wavelength based on the touch position of the touch pen.

The control method may further include displaying a touch trajectory by the touch pen as the identified color.

The display apparatus may further include a bezel disposed at an outer region of the display and a guide member formed to protrude at one region of the bezel, and the plurality of light receiving elements may be supported by the guide member and disposed to be inclined toward a direction of a screen of the display.

According to various embodiments, a user may perform a touch operation using an input device in various pen shapes, and a pen color of a touch pen may be automatically identified without a separate user setting.

BRIEF DESCRIPTION OF THE DRAWING FIGURES

The above and/or other aspects, features, and advantages of certain embodiments of the disclosure will be more apparent from the following description taken in conjunction with the accompanying drawings, in which.

DETAILED DESCRIPTION OF THE EMBODIMENTS

Figure 1:
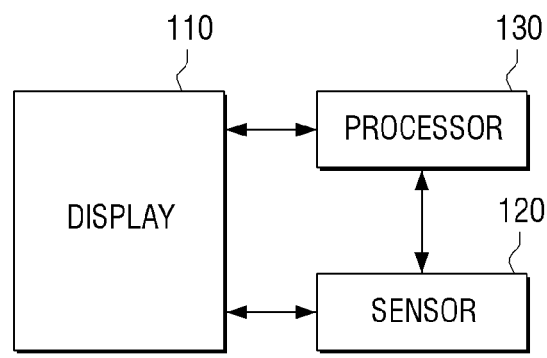
FIG. 1 is a block diagram illustrating a configuration of a display apparatus according to an embodiment.

Before specifically describing the disclosure, a method for demonstrating the present specification and drawings will be described.

The terms used in the disclosure and the claims are general terms identified in consideration of the functions of the various embodiments of the disclosure. However, these terms may vary depending on intention, legal or technical interpretation, emergence of new technologies, and the like of those skilled in the related art. Also, there may be some terms arbitrarily identified. Unless there is a specific definition of a term, the term may be construed based on the overall contents and technological common sense of those skilled in the related art.

The terms such as "first," "second," and so on may be used to describe a variety of elements, but the elements should not be limited by these terms. The terms are used only for the purpose of distinguishing one element from another.

The expression "At least one of A or/and B" should be understood to represent "A" or "B" or any one of "A and B."

In addition, the description in the disclosure that one element (e.g., a first element) is "(operatively or communicatively) coupled with/to" or "connected to" another element (e.g., a second element) should be interpreted to include both the case that the one element is directly coupled to the another element, and the case that the one element is coupled to the another element through still another element (e.g., a third element).

A singular expression includes a plural expression, unless otherwise specified. It is to be understood that the terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

The terms such as "module," "unit," "part," and so on are used to refer to an element that performs at least one function or operation, and such element may be implemented as hardware or software, or a combination of hardware and software. Further, except for when each of a plurality of "modules," "units," "parts," and the like needs to be realized in an individual hardware, the components may be integrated in at least one module or chip and be realized in at least one processor.

Hereinafter, embodiments of the disclosure will be described in detail with reference to the accompanying drawings so that those skilled in the art to which the disclosure pertains may easily practice the disclosure. However, the disclosure may be implemented in various different forms and is not limited to embodiments described herein. In addition, in the drawings, portions unrelated to the description will be omitted to avoid obscuring the disclosure, and similar portions will be denoted by similar reference numerals throughout the specification.

FIG. 1 is a block diagram illustrating a configuration of a display apparatus according to an embodiment.

A display apparatus 100 may be implemented as various types of apparatuses equipped with a display function. For example, the display apparatus 100 may be implemented as an apparatus having a display function, such as a TV, a smartphone, a tablet personal computer (PC), a portable multimedia player (PMP), a personal digital assistant (PDA), a laptop computer, a smart watch, a head mounted display (HMD), a near eye display (NED), or the like.

Referring to FIG. 1, the display apparatus 100 includes a display 110, a sensor 120, and a processor 130.

The display 110 may provide various content screens. Here, the content screen may include various content such as an image, a moving image, a text, music, or the like, an application execution screen, a graphic user interface (GUI) screen, or the like.

The display 110 according to an embodiment may be implemented as a liquid crystal display (LCD), an organic light-emitting diode (OLED), a liquid crystal on silicon (LCoS), a digital light processing (DLP), a micro LED, a quantum dot (QD) display panel, and the like, but the display 110 is not limited thereto. The display 110 may also be implemented as a flexible display, a transparent display, or the like.

The display 110 according to an embodiment may be integrated with a touch pad and implemented as a touch screen to receive a touch input of a user or a touch input through various types of input devices (for example, a touch pen). Hereinafter, for convenience of description, the display 110 is described as being implemented as a touch screen and receives a touch input.

The sensor 120 may be disposed in an outer region of the display 110. In particular, the sensor 120 may include a plurality of light emitting elements arranged in various forms, for example, a light emitting diode (LED) and a plurality of light receiving elements, for example, a photo-diode or a photo-detector (PD). A detailed description will be given with reference to FIG. 2.

Figure 2:
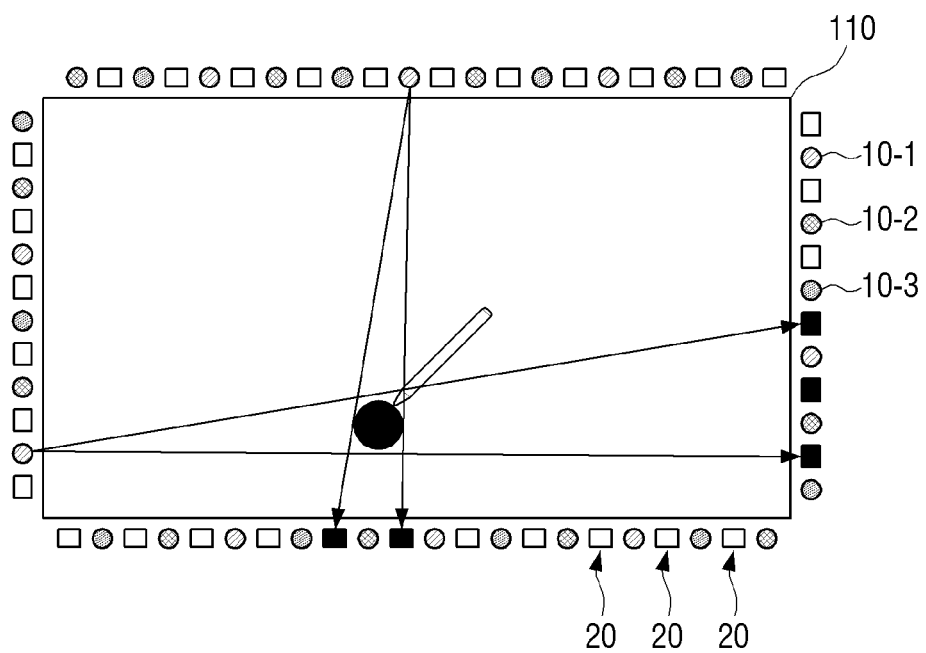
FIG. 2 is a view provided to describe a sensor according to an embodiment.

FIG. 2 is a view provided to describe a sensor according to an embodiment.

Referring to FIG. 2, the sensor 120 may be disposed at an outer region (or an edge region or periphery region adjacent to a display area of the display 110) of the display 110. Here, the sensor 120 may include a plurality of light-emitting element groups 10, and each light-emitting group of the plurality of light-emitting element groups 10 may include a plurality of light-emitting elements 10-1, 10-2, and 10-3. Here, the outer region may be a bezel region, but the outer region is not limited thereto.

The plurality of light emitting elements 10-1, 10-2, and 10-3 may emit lights of different wavelengths. For example, the light emitting element group 10 may include first to third light emitting elements 10-1, 10-2, and 10-3, and the first light emitting element 10-1 may emit a light of a first wavelength, the second light emitting element 10-2 may emit light of a second wavelength, and the third light emitting element 10-3 may emit light of a third wavelength. The light emitting element group 10 may include various numbers of light emitting elements. For example, the light emitting element group 10 may include first to fifth light emitting elements, and the first to fifth light emitting elements may emit lights of different wavelengths.

Here, the light emitting element may emit light of various intensities according to the magnitude of the applied current. Further, the light emitting element may emit light included in various wavelength regions such as ultraviolet rays, visible rays, and infrared rays depending on the manufacturing method and materials. For example, the light emitting element may be implemented as an infrared ray emitting diode (IRED). The first to third light emitting elements may have different peak wavelengths. For example, the first light emitting element may have characteristics of a peak wavelength of 800 nm and a bandwidth of 50 nm. In this case, the first light emitting element may emit infrared rays in the 750 nm to 850 nm bands. Each of the second light emitting element and the third light emitting element may have different peak wavelengths, and emit lights of different wavelengths. This is merely an embodiment and the embodiment is not necessarily limited thereto. In addition, the first to third light emitting elements 10-1, 10-2, and 10-3 may emit light in an ultraviolet or visible light range. For convenience of description, the light emitting element group 10 is described as including a plurality of light emitting elements 10-1, 10-2, and 10-3 devices that emit light having different respective wavelengths, but this configuration is merely exemplary and the configuration of the light emitting elements 10 is not limited thereto. For example, the sensor 120 may include only a plurality of light emitting elements emitting light of the same wavelength or a plurality of light emitting elements of the same specification.

Each of a plurality of light receiving elements 20 according to an embodiment may receive light. In one example, the light receiving element 20 may receive the light emitted by the light emitting element. Further, the light receiving element 20 may receive reflective light that is emitted by the light emitting element and reflected from an object. Here, the light receiving element 20 may be any element that converts an optical signal, light energy, or the like, into an electric signal or electric energy. The light receiving element 20 may be a light detector, a light receiving sensor, an infrared light receiving module, or the like, but will be referred to as a light receiving element 20.

The light receiving element 20 according to an embodiment may output a signal intensity of the received light. For example, the light receiving element 20 may provide a signal of intensity of detected light to the processor 130.

According to an embodiment, each of the plurality of light receiving elements 20 may be interposed between the two of plurality of light emitting elements 10-1, 10-2, and 10-3. For example, the light receiving element 20 may be disposed between the first light emitting element 10-1 and the second light emitting element 10-2, and the light emitting element 20 may be disposed between the second light emitting element 10-2 and the third light emitting element 10-3. Thus, the light emitting elements 10 and the light receiving elements 20 may be arranged in an alternating fashion. This is merely an embodiment, and the sensor 120 may include a plurality of light emitting element groups 10 and a plurality of light receiving elements 20 arranged in various forms.

The processor 130 according to an embodiment may be implemented with a digital signal processor (DSP), a microprocessor, and a time controller (TCON) which process a digital image signal, but the processor 130 is not limited thereto. The processor 130 may include one or more among a central processing unit (CPU), a micro controller unit (MCU), a micro processing unit (MPU), a controller, an application processor (AP), a communication processor (CP), and an advanced reduced instruction set computing (RISC) machine (ARM) processor or may be defined as a corresponding term. The processor 130 may be implemented in a system on chip (SoC) type or a large scale integration (LSI) type in which a processing algorithm is programmed therein or in a field programmable gate array (FPGA) type.

The processor 130 may perform various functions by executing computer executable instructions stored in a memory of the display device.

In particular, when a touch by a touch pen on the display 110 is sensed, the processor 130 may identify a touch position of the touch pen according to a signal received from the sensor 120.

Referring to FIG. 2, a lattice structure is formed by light emitted by the plurality of light emitting elements 10-2, 10-2, and 10-3 disposed in an outer region of the display 110. Each of the plurality of light receiving elements 20 may receive a same intensity of light emitted by the plurality of light emitting elements 10-1, 10-2, and 10-3, before the touch pen contacts the display 110.

According to an embodiment, if the touch pen contacts the display 110, a part of light emitted by the plurality of light emitting elements 10-1, 10-2, and 10-3 may be absorbed by the touch pen. A remainder of light emitted by the plurality of light emitting elements 10-1, 10-2, and 10-3 may be refracted or reflected by the touch pen and received by the light receiving element 20.

The processor 130 according to an embodiment may identify the touch position by the touch pen based on the position of one or more of the light receiving elements 20, among the plurality of light receiving elements 20, of which an intensity of received light is less than a predetermined threshold value. The predetermined threshold value may be an intensity of light that is received when the touch pen is not present. For example, when the light emitted by the light emitting element is reflected and absorbed by the touch pen, the intensity of light received by a specific light receiving element among the plurality of light receiving elements 20 may be reduced or approach zero. The processor 130 may identify the touch position based on the position corresponding to the light receiving element receiving reduced intensity of light. As another example, if the intensity of the light received by the specific light receiving element among the plurality of light receiving elements 20 is identified to be less than the intensity of the light received by the light receiving element adjacent to the light receiving element by a predetermined percent, the processor 130 may identify the position corresponding to the receiving element as the touch position.

This is merely an embodiment, and the display 110, instead of the sensor 120, may sense a touch by a touch pen and identify a touch position. For example, the display 110 may include a pen sensing unit (for example, a pen recognition panel). The pen sensing unit may sense a touch according to a change in the intensity of an electromagnetic field by a touch pen (for example, a stylus pen, a digitizer pen), and identify the touch position. The pen sensing unit may include a resistive sensor, surface capacitive sensor, projected capacitive sensor, surface acoustic wave sensor, infrared sensor, or pressure sensor. Thus, the touch position of the touch pen may be sensed according to any one of various sensing methods of the pen sensing unit. Meanwhile, the touch pen is not limited to an exclusive pen of the display apparatus 100. The touch pen according to an embodiment may be objects of various types (resistive type, electrostatic type, or the like) capable of touch recognition by the display apparatus 100. Further, the touch pen is not necessarily limited to a pen but may be a part of the user's body (for example, a finger or the like).

As another example, the processor 130 may measure the distance between the touch pen and the outer region of the display 100 based on the signal intensity of the light received by the light receiving element 20. For example, the processor 130 may calculate the distance by measuring the time between reflection of the light emitted from the plurality of light emitting elements 10-1, 10-2, and 10-3 onto the touch pen and reception of the emitted light by the light receiving element 20. The processor 130 may then identify a touch position by the touch pen based on the measured distance, or a time of flight of the signals.

Returning to FIG. 1, the processor 130 according to an embodiment may, when a touch position is identified, control that at least one light emitting element group 10, among a plurality of light emitting element groups 10, emits light based on the touch position. For example, the processor 130 may control such that the plurality of light emitting elements 10-1, 10-2, and 10-3 included in the specific light emitting element group 10 emit light of different wavelengths based on the identified touch position. The processor 130 may then identify the pen color of the touch pen based on the signal intensity of the received light, when light of different wavelengths is received by the plurality of light receiving elements 20. This will be further described with reference to FIG. 3.

Figure 3:
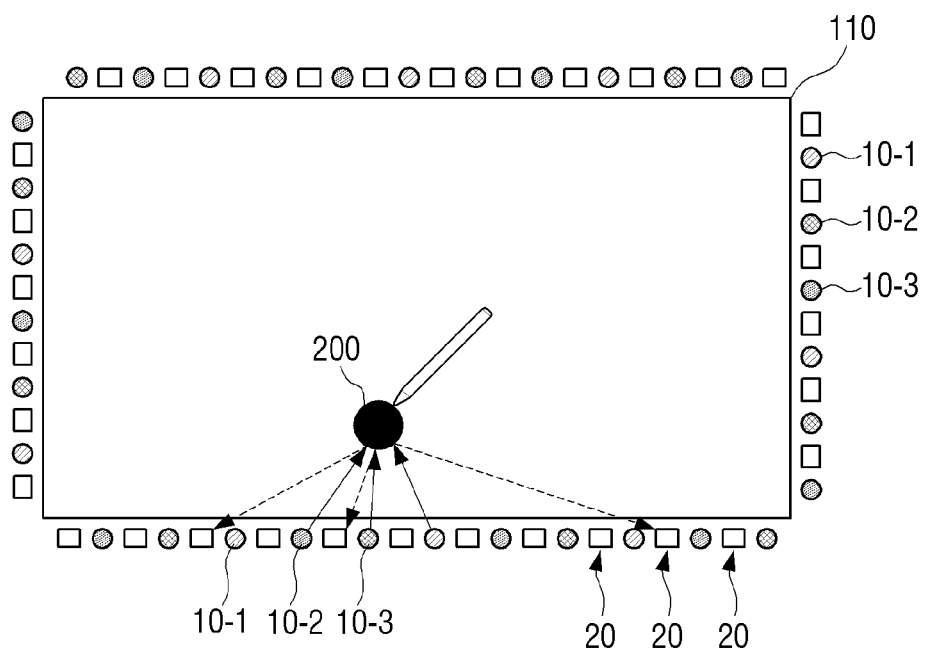
FIG. 3 is a view provided to describe a pen color according to an embodiment.

FIG. 3 is a view provided to describe a pen color according to an embodiment.

Referring to FIG. 3, the processor 130 according to an embodiment may control that at least one light emitting element group 10, from among a plurality of light emitting element groups 10, emits light based on the identified touch position 200.

For example, the processor 130 may control that the plurality of light emitting elements 10-1, 10-2, and 10-3 included in the light emitting element group 10 most adjacent to the identified touch position 200, from among a plurality of light emitting element groups, emit light in different wavelengths. This is an embodiment and is not necessarily limited thereto. For example, the processor 130 may control that the plurality of light emitting element groups 10 disposed in the border region closest to the identified touch position 200 among the four border regions emit light, with respect to the display 110.

As another example, the processor 130 may control that the light emitting element group 10 closest to the identified touch position and the light emitting element group 10 disposed at both sides of the light emitting element group, among the plurality of light emitting groups 10, emit light.

The processor 130 according to an embodiment may control the plurality of light emitting elements 10-1, 10-2, and 10-3 included in the at least one light emitting group 10 to emit light of different wavelengths.

The processor 130 according to another embodiment may control the plurality of light emitting elements 10-1, 10-2, and 10-3 to sequentially emit light of different wavelengths. When the plurality of light emitting elements 10-1, 10-2, and 10-3 sequentially emit light, interference between light emitted from the plurality of light emitting elements may be reduced.

The processor 130 according to another embodiment may control the plurality of light emitting elements 10-1, 10-2, and 10-3 to emit lights of different frequencies. If the frequencies are varied, interference of light between each other may be avoided. Hereinafter, for convenience of description, the plurality of light emitting elements 10-1, 10-2, and 10-3 are described to emit light of wavelengths that are different from each other.

Referring to FIG. 3, the processor 130 may control the plurality of light emitting elements 10-1, 10-2, and 10-3 included in the light emitting group closest to the identified touch position to sequentially emit light. For example, after the first light emitting element emits the light of the first wavelength, the second light emitting element may emit light of the second wavelength, and then the third light emitting element may emit light of the third wavelength. This is merely an embodiment, and is not limited thereto. For example, the processor 130 may activate each of the first to third light emitting elements 10-1, 10-2, and 10-3 at non-overlapping cycles. The processor 130 may activate any one of the light emitting elements, and while the light is being emitted, the processor 130 may maintain the remaining light emitting elements in the deactivated state in which light is not emitted.

When the light of different wavelengths emitted by the plurality of light emitting elements included in the light emitting element group is received by the plurality of light receiving elements, the processor 130 according to an embodiment may identify the pen color of the touch pen based on the signal intensities of the received lights.

For example, each of the first to third light emitting elements 10-1, 10-2, and 10-3 included in the light emitting element group 10 may sequentially emit light of the first to third wavelengths at different light emission timings. Then, when the plurality of light receiving elements 20 receive the light reflected by the touch pen, the processor 130 may identify the pen color based on the signal intensity of the reflected light. However, in some cases, light of the first to third wavelengths may be emitted at the same emission timing.

Figure 4:
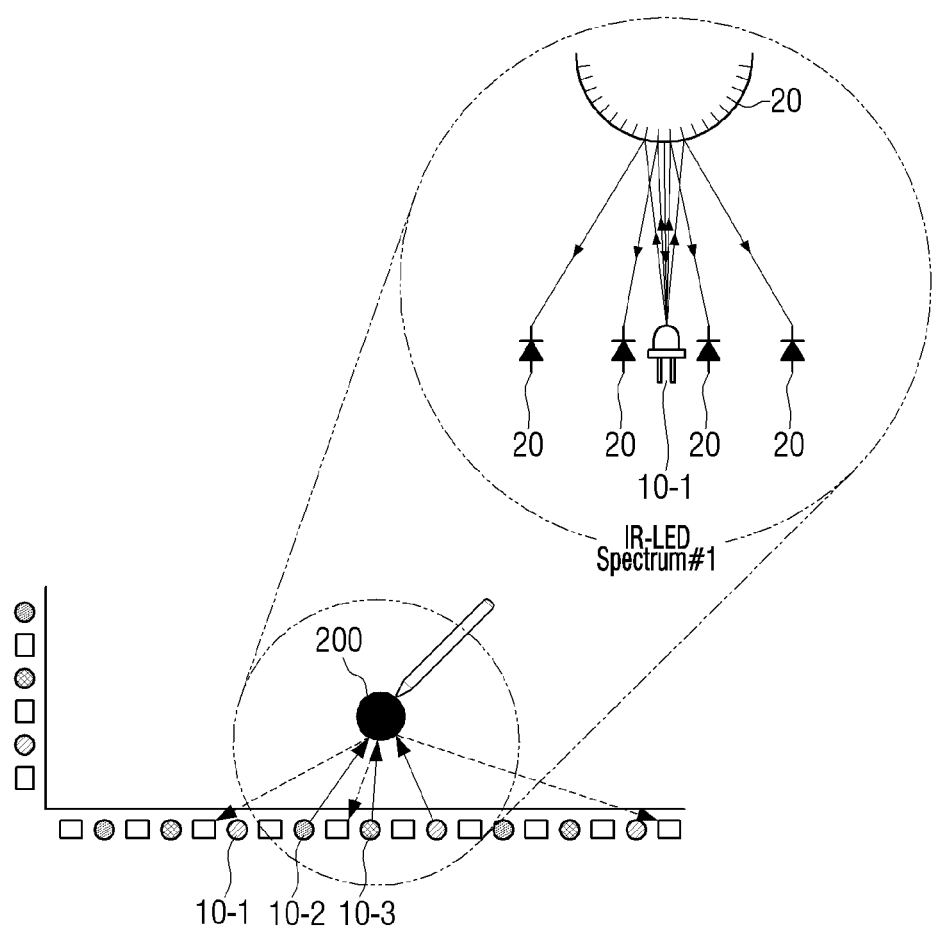
FIG. 4 is a view provided to describe light of different wavelengths according to an embodiment.

Referring to FIG. 4, the light of different wavelengths emitted by the plurality of light emitting elements 10-1, 10-2, and 10-3 will be described.

FIG. 4 is a view provided to describe light of different wavelengths according to an embodiment. According to an embodiment, when the light of different wavelengths emitted by the plurality of light emitting elements 10-1, 10-2, and 10-3 are reflected by a pen tip provided in the touch pen and received by each of the plurality of light emitting elements, the processor 130 may identify the pen color of the touch pen based on the signal intensity distribution of the reflected lights.

For example, when the touch position 200 is identified, the processor 130 may control the light emitting element group 10 so that the plurality of light emitting elements 10-1, 10-2, and 10-3 included in the at least one light emitting element group 10 emit light of different wavelengths based on the identified touch position.

The light receiving element 20 according to an embodiment may accumulate information on the intensity of the reflected light that is emitted from the first light emitting element 10-1 and reflected from the touch pen, the information on the intensity of the reflected light that is emitted from the second light emitting element 10-2 and reflected from the touch pen, and the information on the intensity of the reflected light that is emitted from the third light emitting element 10-2 and reflected from the touch pen, and transmit the accumulated information on the intensity of the reflected light to the processor 130.

The processor 130 may identify the information on the intensities of the reflected light received through the plurality of light receiving elements 20.

The processor 130 according to an embodiment may identify the pen color of the touch pen based on the signal intensity distribution of the reflected lights. Here, the pen color may mean the color of the pen tip which is in direct contact with the display 110 in the touch pen.

The plurality of light emitting elements 10-1, 10-2, and 10-3 may be implemented as an infrared light emitting diode that emits light of infrared light region.

According to one embodiment, the first light emitting element 10-1 may emit light of a first wavelength in the 800 nm band, the second light emitting element 10-2 may emit light of the second wavelength in the 870 nm band, and the third light emitting element 10-3 may emit light of the third wavelength in the 940 nm band, but the emitted wavelengths are not necessarily limited thereto. In addition, the first to third light emitting elements 10-1, 10-2, and 10-3 may emit light in the ultraviolet or visible light region.

Returning to FIG. 1, the processor 130 according to an embodiment may display the touch trajectory by the touch pen as identified pen color. For example, when the identified pen color is "blue," the processor 130 may display a touch area by the touch pen, that is, the touch trajectory as "blue." In other words, upon determination of the color of the touch pen, the processor 130 may control the display 110 to digitally draw lines, markings, or other indications corresponding to the trajectory of the pen on the display 110 in the particular color of the touch pen. Thereby, by varying a color of a tip of the touch pen, the display 110 may be controlled to draw lines of colors corresponding to the color of the touch pen.

The processor 130 according to an embodiment may include a central processing unit (CPU), a read-only memory (ROM or non-volatile memory) having a control program to control the display apparatus 100 stored therein, and a random access memory (RAM or volatile memory) that stores data input from sources external to the display apparatus 100, or is used as a storage area for data or applications corresponding to various operations performed by the display apparatus 100.

The processor 130 is a configuration to control overall operations of the display apparatus 100. For example, the processor 130 may drive an operating system (OS) to control a plurality of hardware or software elements connected to the processor 130, and perform data processing and operation.

Specifically, the processor 130 includes a random access memory (RAM), read-only memory (ROM), main CPU, one or more interfaces, and bus.

The RAM, ROM, main CPU, one or more interfaces, or the like, may be interconnected through the bus.

The ROM stores a command set for booting the system and the like. When the turn-on command is input and power is supplied, the CPU copies the OS stored in the storage to the RAM according to the instruction stored in the ROM, executes OS to boot the system. When the booting is completed, the CPU may copy various programs stored in the storage to the RAM, execute programs copied to the RAM, and perform various operations.

The main CPU access the storage and performs booting using the OS stored in the storage. The main CPU performs various operations using various programs and content data, or the like, stored in the storage.

The one or more interfaces are connected to the various elements as described above. One of the interfaces may be network interface connected to an external device through a network.

The processor 130 may perform graphic processing function (video processing function). For example, the processor 130 may generate a screen including various objects such as an icon, an image, a text, or the like, using an operator and a renderer.

The processor 130 may perform processing on audio data. Specifically, the processor 130 may perform various processing such as decoding or amplification, noise filtering, or the like, for audio data.

The display apparatus 100 according to an embodiment may include a communication interface.

The communication interface is an interface for performing communication with various types of external devices according to various types of communication methods or protocols. The communication interface includes a Wi-Fi chip, a Bluetooth chip, an infrared communication chip, a wireless communication chip, or the like. The processor 130 may communicate with various external devices using the communication interface.

The display apparatus 100 may communicate with other external devices. At this time, the external device may be an electronic device capable of outputting image content. For example, if an external device is a TV, the type of external device is an imaging device, and the output data information on a TV may include, but may not be limited to, the model name of the TV, the audio characteristics of the TV's output content, and the frequency characteristics of the output audio among the TV's output content. In addition, external devices with which the display apparatus 100 communicates with via the communication interface may include a remote controller, a Bluetooth speaker, a lighting device, a smart cleaner, a smart refrigerator, and an Internet of Things (TOT) home manager, or the like, in addition to devices capable of outputting an image content.

The Wi-Fi chip and the Bluetooth chip communicate with each other using the Wi-Fi method and the Bluetooth method, respectively. When a Wi-Fi chip or a Bluetooth chip is used, various connection information such as a service set identifier (SSID) and a session key may be transceived first, and communication information may be transceived.

The infrared communication chip performs communication according to an infrared data association (IrDA) technology for wirelessly transmitting data at a short distance using infrared rays between the visible rays and a millimeter wave.

The wireless communication chip refers to a chip performing communication according to various communication standards such as Zigbee, 3rd generation (3G), 3rd generation partnership project (3GPP), long term evolution (LTE), LTE advanced (LTE-A), 4th generation (4G), $5^{th}$ generation (5G), or the like, in addition to the Wi-Fi chip and the Bluetooth chip described above.

The electronic apparatus 100 may additionally include a tuner and a demodulator according to examples.

The tuner may receive a radio frequency (RF) broadcasting signal by tuning a channel selected by a user or all the channels, from among RF broadcasting signals that are received through the antenna.

A demodulator may receive and demodulate a digital intermediate frequency (DIF) signal that is converted by the tuner, and perform channel decoding, or the like.

According to an embodiment, the communication interface may use the Wi-Fi module to communicate with an external device such as a remote controller and an external server. Alternatively, when the communication interface is implemented as a plurality of communicators, the communication interface may use a communicator which includes at least one of an Ethernet modem or Wi-Fi modem for communicating with an external server, and use a communicator including a Bluetooth (BT) module to communicate with an external device such as a remote controller. This is merely exemplary and is not limited thereto.

In particular, the communicator may receive the information on the reflected light intensity of wavelengths of specific colors, by communicating with the server. The information on the reflected light intensity of wavelengths by specific colors will be described specifically in FIG. 8.

The display apparatus 100 according to embodiment may include a storage. The storage may store various data such as the OS software module to drive the display apparatus 100 and various multimedia contents.

For example, the storage may be implemented as an internal memory such as a read-only memory (ROM) (e.g., electrically erasable programmable read-only memory (EEPROM)) and random access memory (RAM)) or may be implemented as a memory separate from the processor 130. In this case, the storage may be implemented as a memory embedded in the display apparatus 100, or may be implemented as a detachable memory in the image display apparatus 100, according to the data usage purpose. For example, data for driving the display apparatus 100 may be stored in a memory embedded in the display apparatus 100, and data for an additional function of the display apparatus 100 may be stored in the memory detachable to the image processing apparatus. A memory embedded in the display apparatus 100 may be a volatile memory such as a dynamic random access memory (DRAM), a static random access memory (SRAM), a synchronous dynamic random access memory (SDRAM), or a nonvolatile memory such as one time programmable ROM (OTPROM), programmable ROM (PROM), erasable and programmable ROM (EPROM), electrically erasable and programmable ROM (EEPROM), mask ROM, flash ROM, a flash memory (for example, NAND flash or NOR flash), a hard disk drive or a solid state drive (SSD). A memory detachably mounted to the image processing apparatus 100 may be implemented as a memory card (for example, a compact flash (CF), secure digital (SD), micro secure digital (micro-SD), mini secure digital (mini-SD), extreme digital (xD), multi-media card (MMC), etc.), an external memory (for example, a universal serial bus (USB) memory) connectable to a USB port, or the like.

The display apparatus 100 according to an embodiment may include the user interface.

The user interface may be implemented as a device such as a button, a touch pad, a mouse, and a keyboard, or a touch screen or a remote control receiver capable of performing the above-described display function and operation input function. The button may be various types of buttons such as a mechanical button, a touch pad, a wheel, and the like formed in an arbitrary area such as a front surface portion, a side surface portion, and a back surface portion of the main body of the display apparatus 100.

The display apparatus 100 according to an embodiment may include an input and output interface.

The input and output interface may be any one interface from among high definition multimedia interface (HDMI), mobile high definition link (MHL), universal serial bus (USB), display port (DP), Thunderbolt, video graphics array (VGA) port, RGB port, d-subminiature (D-SUB), digital visual interface (DVI), and the like.

The HDMI is an interface that enables the transmission of high-performance data for audio-video (AV) devices that output audio and video. The DP may implement full HD level in a format of 1920x1080 as well as ultra-high resolution screens such as a format of 2560x1600 or 3840x2160 and 3D stereoscopic images, as well as digital voice transferable interface. Thunderbolt is an input/output interface for high-speed data transmission and connection, and may connect all the PC, display, and storage to a single port in parallel.

The input and output interface may input and output at least one of an audio signal and a video signal.

According to an embodiment, the input and output interface may include a port for inputting and outputting only an audio signal or a port for inputting and outputting only a video signal as a separate port, or a single port for inputting and outputting both an audio signal and a video signal.

The display apparatus 100 may transmit an image signal to a separate external display device.

Figure 5:
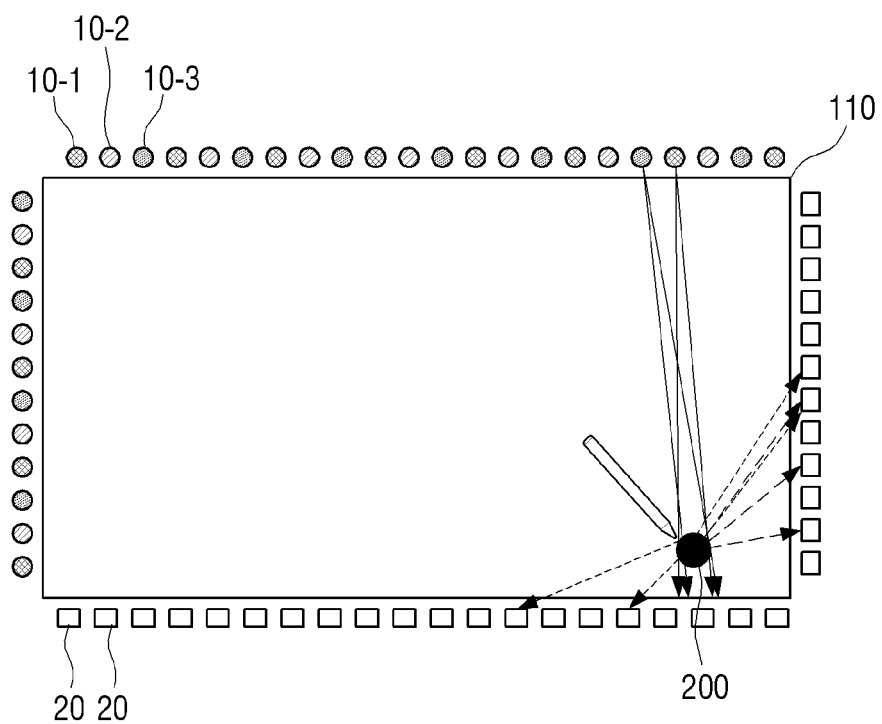
FIG. 5 is a view provided to describe a sensor arrangement according to an embodiment.

FIG. 5 is a view provided to describe a sensor arrangement according to an embodiment.

The sensor 120 according to an embodiment may be arranged in various forms in an outer region of the display 110. The sensor 120 may be embodied as the light receiving elements 20. Referring to FIG. 5, the outer region of the rectangular display 110 includes four border regions, and the plurality of light emitting element groups 10 may be arranged in two adjacent border regions of the four border regions. Further, the plurality of light receiving elements 20 may be arranged in the remaining two border regions. Alternatively, the display 110 may be configured to have a shape other than rectangular, and the light emitting elements 10 and the light receiving elements 20 may be arranged on any border region of the display 110. Moreover, the light emitting elements 10 and the light receiving elements 20 may not be disposed on every border region of the display 110, and may be disposed on only some border regions of the display 110.

When a touch position 200 is identified, the processor 130 according to an embodiment may control the light emitting element groups 10 most adjacent to the identified touch position 200, from among a plurality of light emitting element groups 20 disposed in two border regions, to emit light.

As another embodiment, when the touch position 200 is identified, the processor 130 may control the plurality of light emitting element groups 10 disposed on any one border region between two border regions to emit light.

When the lights emitted by the plurality of light emitting elements 10-1, 10-2, and 10-3 included in the light emitting element group 10 are reflected by a touch pen and received by one or more of the light receiving elements 20, the processor 130 according to an embodiment may identify the pen color of the touch pen based on the signal intensities of light received by the light receiving element 20. Referring to FIG. 5, a solid line represents a path of light emitted by each of the plurality of light emitting elements 10-1, 10-2, and 10-3, and a dotted line represents path of light reflected by the touch pen.

Figure 6:
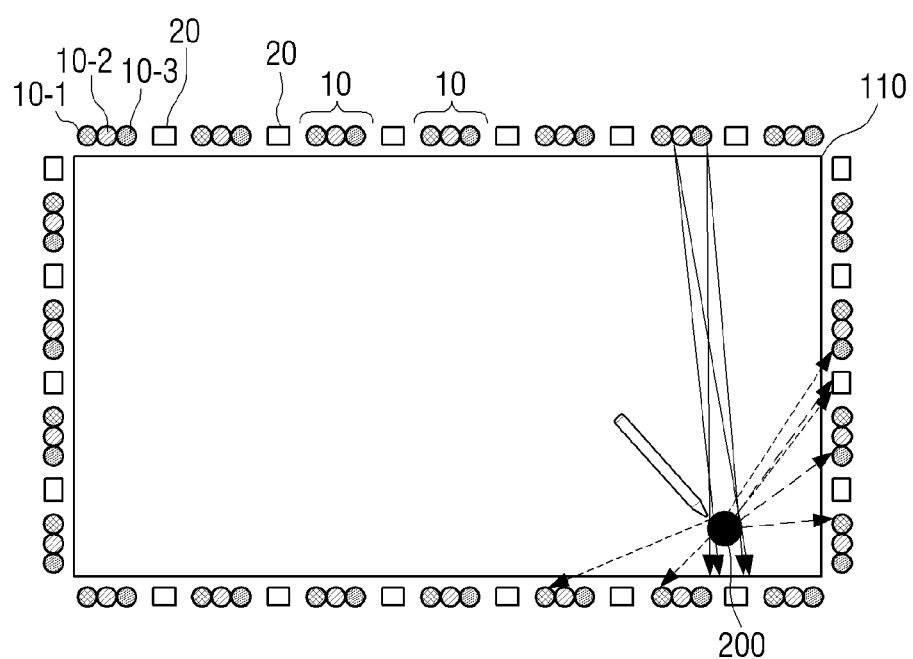
FIG. 6 is a view provided to describe a sensor arrangement according to an embodiment.

FIG. 6 is a view provided to describe a sensor arrangement according to still another embodiment.

Referring to FIG. 6, each of the plurality of light receiving elements 20 may be disposed between the plurality of light emitting element groups 10. For example, the first to third light emitting elements 10-1, 10-2, and 10-3 of a first light emitting element group 10 may be disposed consecutively, the first to third light emitting elements 10-1, 10-2, and 10-3 of a second light emitting element group 10 may be disposed consecutively, and the light receiving element 20 may be interposed between the first light emitting group and the second light emitting group.

The position of sensor 120 as illustrated in FIGS. 2, 5, and 6 is merely an embodiment and is not necessarily limited thereto. For example, the first to third light emitting elements 10-1, 10-2, and 10-3 may be disposed consecutively, and two light receiving elements 20 may be disposed consecutively. As still another example, two light emitting groups 10 may be disposed consecutively and the light receiving elements 20 may be disposed. The display apparatus 100 may include the sensor 120 in which the light emitting element and light emitting element are disposed in various forms.

Figure 7:
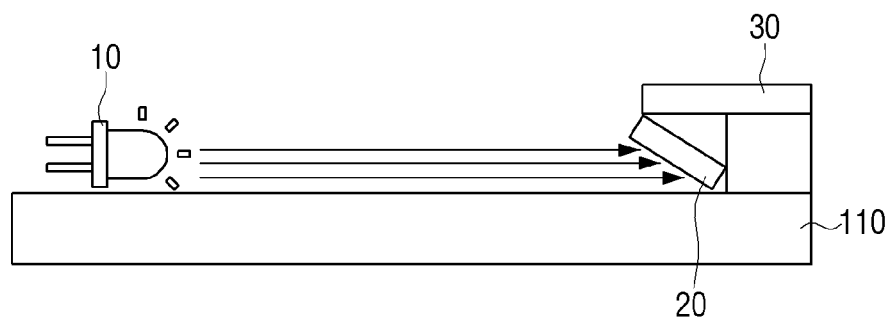
FIG. 7 is a view provided to describe a light emitting element according to an embodiment.

FIG. 7 is a view provided to describe a light emitting element according to an embodiment.

Referring to FIG. 7, the light receiving element 20 according to an embodiment may be disposed to be inclined obliquely toward a direction of a screen of the display 110.

The display apparatus 100 according to one embodiment may include a bezel that houses the display 110. The bezel according to one embodiment may be disposed to surround the outer region of the display 110. The display apparatus 100 may include a guide member 30 that is configured to protrude into one region of the bezel.

The light receiving element 20 according to an embodiment may be supported by the guide member 30 and obliquely disposed toward a direction of the screen of the display 110.

According to one embodiment, when the light receiving element 20 is arranged so as to be inclined at a certain angle, the area for receiving the light emitted from the light emitting element 10 may be set in a way to be relatively wider than a manner in which the light receiving element 20 is arranged not to be inclined. In addition, because the light receiving element 20 is disposed to be inclined, the light receiving element 20 may receive substantially only the light emitted from the light emitting element 10, not the external light, such as the sunlight. For example, the light receiving element 20 may be arranged to be inclined by 90 to 45 degrees relative to a front surface of the screen of the display 110. However, this is merely exemplary, and the light receiving element 20 may be arranged to be inclined at various angles according to a manufacturing method, purpose, or the like, of a manufacturer.

Figure 8:
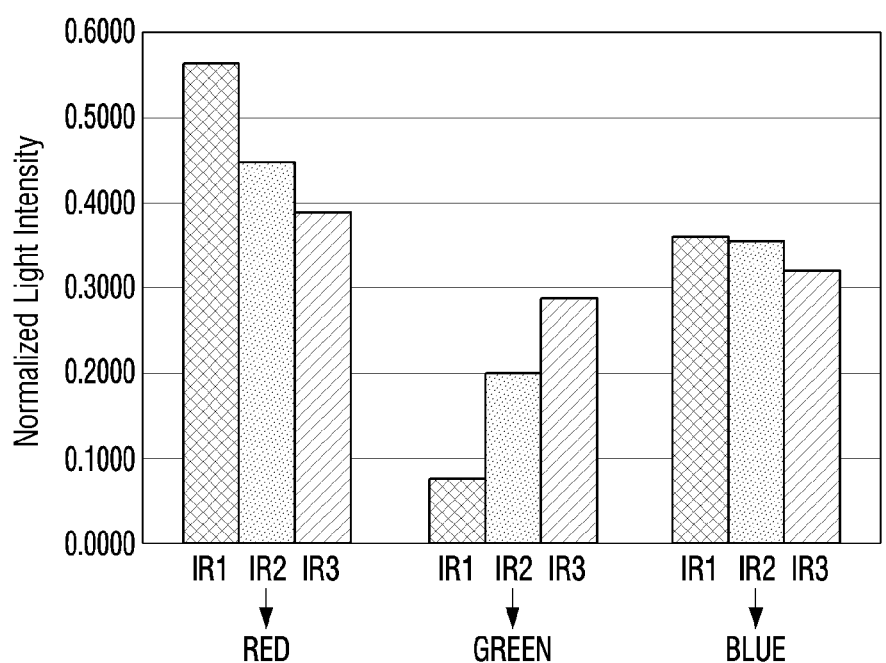
FIG. 8 is a graph provided to describe a signal intensity according to an embodiment.

FIG. 8 is a graph provided to describe a signal intensity according to an embodiment.

The processor 130 according to an embodiment may identify the pen color based on the signal intensity received from the light receiving element 20.

According to an embodiment, a part of light of different wavelengths emitted from the plurality of light emitting elements 10-1, 10-2, and 10-3 may be partially absorbed by the touch pen, and the remainder may be reflected. For example, light of the first wavelength emitted from the first light emitting element 10-1 may be partially absorbed by the touch pen, and the remainder may be reflected. Further, the light of the second wavelength emitted from the second light emitting element 10-2 may be partially absorbed by the touch pen, and the remainder may be reflected. Here, depending on the pen color of the touch pen, the intensity at which the light of the first wavelength is reflected and the intensity at which the light of the second wavelength is reflected may be different from each other. For example, if the pen tip color of the touch pen is red, the light of a first wavelength (e.g., red light at about 635-700 nm) may be reflected with a relatively strong intensity as compared with the light of a second wavelength (e.g., orange light at about 590-635 nm, yellow light at 560-590 nm, green light at 520-560 nm, cyan light at 490-520 nm, blue light at 450-490 nm, or violet light at 400-450 nm). In another example, if the pen tip color is blue, the light of a second wavelength (e.g., blue light at 450-490 nm) may be reflected with a relatively strong intensity compared to light of a first wavelength that is other than blue light.

The display apparatus 100 according to an embodiment may include reflected light intensity information of different wavelengths for different colors. For example, the reflected light intensity information of the first to third wavelengths for the red object may be included. The graph shown in FIG. 8 is merely an embodiment of the reflected light intensity information of the first to third wavelengths for a red, green, band blue objects, but is not limited thereto.

When the lights of the first to third wavelengths emitted by each of the first to third light emitting elements 10-1, 10-2, and 10-3 are reflected by the pen tip of the touch pen and are received by the plurality of light receiving elements 20, the processor 130 according to an embodiment may identify the color of the touch pen based on the intensities of the reflected lights of the first to third wavelengths. For example, if the signal intensities of the reflected light of the first to third wavelengths are similar to green based on the graph shown in FIG. 8, the processor 130 may identify the pen color of the touch pen as green. The display apparatus 100 according to an embodiment may include reflected light intensity information corresponding to each of various colors.

Figure 9:
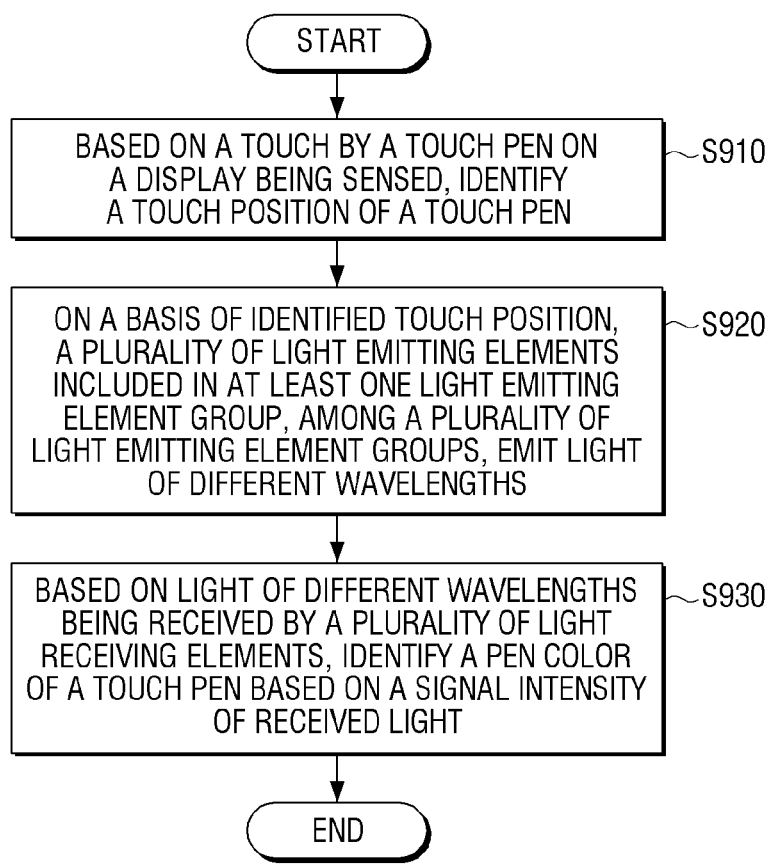
FIG. 9 is a flowchart provided to describe a control method of a display apparatus according to an embodiment.

FIG. 9 is a flowchart provided to describe a control method of a display apparatus according to an embodiment.

The control method of the display apparatus according to an embodiment may identify a touch position of a touch pen, when a touch by the touch pen is sensed on the display in S910.

Subsequently, a plurality of light emitting elements included in at least one light emitting element group, from among a plurality of light emitting element group, emit light of different wavelengths based on the identified touch position in S920.

When lights of different wavelengths are received by the plurality of light receiving elements, the pen color of the touch pen is identified based on the signal intensities of the received lights in S930.

Here, the step S920 of controlling the light of different wavelengths may control so that the plurality of light emitting elements included in at least one light emitting element group sequentially emit light of different wavelengths at different light emission timings.

In S930 of identifying the pen color may, when sequentially emitted light of different wavelengths is reflected by the pen tip provided on the touch pen and is received by each of the plurality of light receiving elements, identify the pen color of the touch pen based on the distribution of the signal strength of the reflected light.

In step S910, the plurality of light emitting elements included in each of the plurality of light emitting element groups may be controlled to emit light. When the emitted light is received by the plurality of light receiving elements, the touch position may be identified based on the position of the light receiving element of which intensity of received light is less than a predetermined threshold value.

The outer region of the display according to an embodiment may include four border regions, a plurality of light emitting element groups may be in two adjacent border regions out of the four border regions, and a plurality of light receiving elements may be disposed in remaining two border regions.

Each of the plurality of light receiving elements may be disposed between a plurality of light emitting groups, or disposed between a plurality of light emitting elements included in each of the plurality of light emitting element groups.

In step S920, the plurality of light emitting element groups included in at least one light emitting element group closest to the touch position, among the plurality of light emitting element groups, may be controlled to emit light.

The control method according to an embodiment may include displaying a touch trajectory by a touch pen with identified colors.

The display apparatus according to an embodiment further includes a bezel disposed at an outer region of the display and a guide member formed to protrude from one region of the bezel, and the plurality of light receiving elements may be supported by the guide member, and disposed so as to be inclined toward a direction of the display screen.

The methods according to various embodiments may be implemented as an application installable in an electronic apparatus.

The methods according to various embodiments may be implemented only by software upgrade or hardware upgrade for a related-art electronic apparatus.

The various embodiments as described above may be performed through an embedded server provided in an electronic apparatus or at least one external server from among the electronic apparatus or a display device.

Meanwhile, various embodiments of the disclosure may be implemented in software, including instructions stored on machine-readable storage media readable by a machine (e.g., a computer). An apparatus may call instructions from the storage medium, and execute the called instruction, including an electronic apparatus (for example, electronic apparatus A) according to the disclosed embodiments. When the instructions are executed by a processor, the processor may perform a function corresponding to the instructions directly or by using other components under the control of the processor. The instructions may include a code generated by a compiler or a code executable by an interpreter. A machine-readable storage medium may be provided in the form of a non-transitory storage medium. Herein, the term "non-transitory" only denotes that a storage medium does not include a signal but is tangible, and does not distinguish the case in which a data is semi-permanently stored in a storage medium from the case in which a data is temporarily stored in a storage medium.

Also, in accordance with one embodiment of the disclosure, a method according to various embodiments described above may be provided in a computer program product. A computer program product may be traded between a seller and a purchaser as a commodity. A computer program product may be distributed in the form of a machine-readable storage medium (e.g., compact disc read only memory (CD-ROM)) or distributed online through an application store (e.g. PlayStore™). In the case of on-line distribution, at least a portion of the computer program product may be stored temporarily, or at least temporarily, in a storage medium such as a manufacturer's server, a server of an application store, or a memory of a relay server.

According to the embodiments, the respective elements (e.g., module or program) of the elements mentioned above may include a single entity or a plurality of entities. According to the embodiments, at least one element or operation from among the corresponding elements mentioned above may be omitted, or at least one other element or operation may be added. Alternatively or additionally, a plurality of components (e.g., module or program) may be combined to form a single entity. In this case, the integrated entity may perform functions of at least one function of an element of each of the plurality of elements in the same manner as or in a similar manner to that performed by the corresponding element from among the plurality of elements before integration. The module, a program module, or operations executed by other elements according to variety of embodiments may be executed consecutively, in parallel, repeatedly, or heuristically, or at least some operations may be executed according to a different order, may be omitted, or the other operation may be added thereto.

Hereinabove, although the embodiments of the disclosure have been shown and described, it should be understood that the disclosure is not limited to the disclosed embodiments and may be variously modified without departing from the spirit and the scope of the disclosure. Therefore, the modifications should not be understood separately from the technical spirit or scope of the disclosure.

What is claimed is:

1. A display apparatus comprising:
   a display;
   a plurality of light emitting elements;
   a plurality of light receiving elements; and
   a processor configured to:
      based on a touch by a touch pen on the display being sensed, identify a touch position of a pen tip of the touch pen,
      control a first light emitting element among the plurality of light emitting elements to emit first light of a first wavelength towards the pen tip and a second light emitting element among the plurality of light emitting elements to emit second light of a second wavelength different from the first wavelength towards the pen tip based on the identified touch position,
      identify a first intensity of the first light reflected from the pen tip received by at least one light receiving element among the plurality of light receiving elements,
      identify a second intensity of the second light reflected from the pen tip received by the at least one light receiving element,
      identify a pen color of the touch pen based on the first intensity and the second intensity based on a signal intensity distribution of the first intensity and the second intensity, and
      control the display to display a touch trajectory based on the sensed touch of the touch pen on the display in the identified pen color of the touch pen.

2. The display apparatus of claim 1, wherein the processor is further configured to sequentially control the first light emitting element to emit the first light of the first wavelength at a first light emission timing and the second light emitting element to emit the second light of the second wavelength at a second light emission timing after the first light emission timing.

3. The display apparatus of claim 1, wherein the processor is further configured to:
   detect the touch by the touch pen on the display,
   control at least one light emitting element among the plurality of light emitting elements to emit light, and
   identify the touch position of the touch pen on the display based on an intensity of the light emitted by the at least one light emitting element reflected from the touch pen received by the plurality of light receiving elements.

4. The display apparatus of claim 1, further comprising:
   an outer region of the display comprising four border regions,
   wherein the plurality of light emitting elements are disposed at two adjacent border regions among the four border regions and the plurality of light receiving elements are disposed at two remaining border regions among the four border regions.

5. The display apparatus of claim 1, wherein each light receiving element among the plurality of light receiving elements is disposed between groups of the plurality of light emitting elements or alternatingly disposed with each light emitting element among the plurality of light emitting elements.

6. The display apparatus of claim 1, wherein the processor is further configured to select the first light emitting element from among the plurality of light emitting elements to emit the first light of the first wavelength and the second light emitting element from among the plurality of light emitting elements to emit the second light of the second wavelength based on the touch position of the touch pen.

7. The display apparatus of claim 1, further comprising:
   a bezel disposed at an outer region of the display; and
   a guide member formed to protrude at one region of the bezel,
   wherein the plurality of light receiving elements are supported by the guide member and disposed to be inclined toward a direction of a screen of the display.

8. A method of controlling a display apparatus, the method comprising:
   based on a touch by a touch pen on the display being sensed, identifying a touch position of a pen tip of the touch pen;
   controlling a first light emitting element among a plurality of light emitting elements of the display apparatus to emit first light of a first wavelength towards the pen tip and a second light emitting element among the plurality of light emitting elements of the display apparatus to emit second light of a second wavelength different from the first wavelength towards the pen tip based on the identified touch position;
   identifying a first intensity of the first light reflected from the pen tip received by at least one light receiving element among a plurality of light receiving elements of the display apparatus,
   identifying a second intensity of the second light reflected from the pen tip received by the at least one light receiving element of the display apparatus;
   identifying a pen color of the touch pen based on the first intensity and the second intensity based on a signal intensity distribution of the first intensity and the second intensity; and
   controlling a display of the display apparatus to display a touch trajectory based on the sensed touch of the touch pen on the display in the identified pen color of the touch pen.

9. The method of claim 8, wherein the controlling the first light emitting element and the second light emitting element comprises controlling the first light emitting element to emit the first light of the first wavelength at a first light emission timing and the second light emitting element to emit the second light of the second wavelength at a second light emission timing after the first light emission timing.

10. The method of claim 8, further comprising:
    detecting the touch by the touch pen on the display;
    controlling at least one light emitting element among the plurality of light emitting elements to emit light; and identifying the touch position of the touch pen on the display based on an intensity of the light emitted by the at least one light emitting element reflected from the touch pen received by the plurality of light receiving elements.

11. The method of claim 8, wherein:
the display apparatus comprises an outer region comprising four border regions, and
the plurality of light emitting elements are disposed at two adjacent border regions among the four border regions and the plurality of light receiving elements are disposed at two remaining border regions among the four border regions.

12. The method of claim 8, wherein each light receiving element among the plurality of light receiving elements is disposed between groups of the plurality of light emitting elements or alternatingly disposed with each light emitting element among the plurality of light emitting elements.

13. The method of claim 8, further comprising selecting the first light emitting element from among the plurality of light emitting elements to emit the first light of the first wavelength and the second light emitting element from among the plurality of light emitting elements to emit the second light of the second wavelength based on the touch position of the touch pen.

14. The method of claim 8, wherein the display apparatus comprises:
a bezel disposed at an outer region of the display; and
a guide member formed to protrude at one region of the bezel, and
wherein the plurality of light receiving elements are supported by the guide member and disposed to be inclined toward a direction of a screen of the display.

* * * * *